United States Patent
Takao (10) Patent No.: US 9,334,193 B2
(45) Date of Patent: May 10, 2016

(54) WEAR RESISTANT MEMBER, AND METHOD FOR MANUFACTURING THE WEAR RESISTANT MEMBER

(75) Inventor: Minoru Takao, Yokohama (JP)

(73) Assignees: KABUSHIKI KAISHA TOSHIBA, Tokyo (JP); TOSHIBA MATERIALS CO., LTD., Yokohama-shi (JP)

(*) Notice: Subject to any disclaimer, the term of this patent is extended or adjusted under 35 U.S.C. 154(b) by 0 days.

(21) Appl. No.: 13/579,472

(22) PCT Filed: Feb. 10, 2011

(86) PCT No.: PCT/JP2011/052910
§ 371 (c)(1),
(2), (4) Date: Aug. 16, 2012

(87) PCT Pub. No.: WO2011/102298
PCT Pub. Date: Aug. 25, 2011

(65) Prior Publication Data
US 2012/0321851 A1    Dec. 20, 2012

(30) Foreign Application Priority Data
Feb. 16, 2010    (JP) .................. 2010-031455

(51) Int. Cl.
*B32B 3/00* (2006.01)
*B32B 15/00* (2006.01)
(Continued)

(52) U.S. Cl.
CPC ........... *C04B 35/5935* (2013.01); *F16C 33/043* (2013.01); *F16C 33/12* (2013.01);
(Continued)

(58) Field of Classification Search
CPC .... C04B 35/58; C04B 35/584; C04B 35/593; C04B 35/645; C04B 35/6455; C04B 2235/3873; C04B 2235/3882; B22F 3/007; F16C 33/30; F16C 33/32
USPC .................. 428/98, 156, 164, 168
See application file for complete search history.

(56) References Cited

U.S. PATENT DOCUMENTS

| 6,242,374 B1* | 6/2001 | Komatsu | 501/97.2 |
| 7,056,850 B2* | 6/2006 | Komatsu | 501/97.2 |

(Continued)

FOREIGN PATENT DOCUMENTS

| EP | 0 579 509 A1 | 1/1994 |
| EP | 1 669 335 A1 | 6/2006 |

(Continued)

OTHER PUBLICATIONS

Ceramic Engineering Handbook. The Ceramic Society of Japan, Yoshida Cho (1989).*

(Continued)

*Primary Examiner* — Aaron Austin
*Assistant Examiner* — Megha Gaitonde
(74) *Attorney, Agent, or Firm* — Oblon, McClelland, Maier & Neustadt, L.L.P (57) ABSTRACT

A wear resistant member formed of ceramic sintered body mainly composed of silicon nitride, the ceramic sintered body containing 10 to 3500 ppm of an Fe component in terms of Fe element, more than 1000 ppm to 2000 ppm of a Ca component in terms of Ca element, and 1 to 2000 ppm of a Mg component in terms of Mg element, wherein a β-phase ratio of silicon nitride crystal grains is 95% or more, a maximum longer diameter of the silicon nitride crystal grains is 40 μm or less, Ca component existing in grain boundary phase is not detected by XRD (X-ray Diffraction method), and each of dispersions in Vickers hardness, fracture toughness and density of the wear resistant member is within a range of ±10%. According to this structure, there can be obtained a wear resistant member comprising a ceramic sintered body improved in grinding-work property in addition to an excellent wear resistant property.

18 Claims, 2 Drawing Sheets

(51) Int. Cl.
  *C04B 35/593* (2006.01)
  *F16C 33/04* (2006.01)
  *F16C 33/12* (2006.01)
  *F16C 33/32* (2006.01)

(52) U.S. Cl.
  CPC ........ *F16C 33/32* (2013.01); *C04B 2235/3206* (2013.01); *C04B 2235/3208* (2013.01); *C04B 2235/3217* (2013.01); *C04B 2235/3225* (2013.01); *C04B 2235/3232* (2013.01); *C04B 2235/3241* (2013.01); *C04B 2235/3244* (2013.01); *C04B 2235/3251* (2013.01); *C04B 2235/3256* (2013.01); *C04B 2235/3258* (2013.01); *C04B 2235/3272* (2013.01); *C04B 2235/3865* (2013.01); *C04B 2235/5409* (2013.01); *C04B 2235/604* (2013.01); *C04B 2235/656* (2013.01); *C04B 2235/6562* (2013.01); *C04B 2235/6567* (2013.01); *C04B 2235/661* (2013.01); *C04B 2235/72* (2013.01); *C04B 2235/767* (2013.01); *C04B 2235/77* (2013.01); *C04B 2235/786* (2013.01); *C04B 2235/788* (2013.01); *C04B 2235/85* (2013.01); *C04B 2235/96* (2013.01); *C04B 2235/963* (2013.01); *F16C 2206/60* (2013.01); *F16C 2220/20* (2013.01); *Y10T 428/24355* (2015.01)

(56) References Cited

U.S. PATENT DOCUMENTS 7,521,388 B2    4/2009  Komatsu et al.
2002/0136908 A1*  9/2002  Komatsu et al. .............. 428/446

FOREIGN PATENT DOCUMENTS

| JP | 2002 326875 | 11/2002 |
| JP | 2004-161605 A | 6/2004 |
| JP | 2006-36553 A | 2/2006 |
| JP | 2006-36554 A | 2/2006 |
| JP | 2007-326745 A | 12/2007 |
| WO | 2005 030674 | 4/2005 |
| WO | 2009 128386 | 10/2009 |

OTHER PUBLICATIONS

"Material Database—Muki Zairyo—," The Nikkan Koguo Shibun, Ltd., 1st edition, 1st print, Total 4 Pages, (Oct. 25, 1989).

International Search Report Issued May 17, 2011 in PCT/JP11/52910 Filed Feb. 10, 2011.

The Ceramic Society of Japan (Yoshida et al.), Ceramic Engineering Handbook (Ver. 1, First Edition), Apr. 10, 1989, pp. 887-890, Ginhodo Shuppan Co., Ltd.

* cited by examiner

WEAR RESISTANT MEMBER, AND METHOD FOR MANUFACTURING THE WEAR RESISTANT MEMBER

TECHNICAL FIELD

The present invention relates to a wear (abrasion) resistant member and a method for manufacturing the member, and more particularly to a wear resistant member comprising a ceramic sintered body mainly formed of silicon nitride, and a method for manufacturing the wear resistant member.

BACKGROUND ART

A ceramic sintered body has properties of light weight, high hardness, high wear resistance, high anti-corrosion resistance and low thermal expansion coefficient, so that the ceramic sintered body has been widely used as a member for constituting precious devices. In particular, from the viewpoint of excellence in high hardness and the wear resistance, the ceramic sintered body has been preferably utilized as the wear resistant member constituting a bearing. Among various ceramic sintered bodies, a silicon nitride ($Si_3N_4$) sintered body has a high hardness and an excellent wear resistance, so that the silicon nitride sintered body has been preferably used as a member for constituting the bearings or the like.

Regarding this silicon nitride sintered body, for the purpose of improving a reliability as the wear resistant member for constituting the bearings or the like, further improvements in properties have been advanced in these days. For example, there has been proposed a method of manufacturing the silicon nitride sintered body, comprising the steps of:

preparing a material powder mixture by adding yttrium oxide, spinel, aluminum oxide and/or aluminum nitride to a silicon nitride material powder at predetermined molar ratio of specified metal elements and predetermined content ratio;

preparing a compact body (molded body) formed from the material powder mixture;

sintering the compact body at a temperature of 1400 to 1500° C.; further sintering the compact body at a temperature of 1500 to 1650° C. thereby to obtain a sintered body having a relative density of about 98%; and conducting a secondary sintering (main sintering) operation to the sintered body at a temperature of 1400 to 1650° C. in a nitrogen gas atmosphere of 10 atm or higher thereby to increase the relative density to be about 99%, so that there can be manufactured a silicon nitride sintered body excellent in strength and having less scattering in strength properties (for example, refer to Patent Document 1).

Further, as the silicon nitride raw material powder used for manufacturing this type of the silicon nitride sintered body, it is generally known that a high-purity material powder is preferably used. for example, a high purity material powder synthesized through an imido thermal decomposition method has been suitably used.

However, this high-purity material powder is costly expensive, and mechanical strength and fracture toughness values of thus manufactured silicon nitride sintered body are tend to become excessively large, so that there is posed a problem such that a workability of the resultant sintered body is not sufficient.

In order to solve this problem, there has been reviewed a method of manufacturing the silicon nitride sintered body by using a cheap silicon nitride raw material powder manufactured through a direct nitriding method in which a metal Si is directly nitrided. The silicon nitride raw material powder manufactured through the direct nitriding method has relatively large Fe and Ca contents.

However, it is known that when the contents of the rare earth element, aluminum component and silicon carbide or the like are controlled to be within predetermined ranges, so that there can be obtained a sintered body having a mechanical strength, a wear resistance and a rolling life property that are equal to or more than those of conventional sintered bodies, and the resultant sintered body is also excellent in workability (for example, refer to Patent Document 2).

As described above, when the compact (molded body) formed of the material powder mixture containing the silicon nitride raw material powder is subjected to a primary sintering, a sintered body having a relative density of about 98% is obtained. Thereafter, the resultant sintered body is further subjected to a secondary sintering operation in a nitrogen gas atmosphere having a pressure of 10 atm or higher so as to obtain a sintered body having a relative density of over 98%; preferably 99% or higher, thereby to manufacture a silicon nitride sintered body excellent in strength and having a less scattering in strength properties.

However, in order to obtain the relative density of about 98% at the primary sintering operation, it is necessary to strictly control the manufacturing process, so that there is posed a problem such that a production cost required for manufacturing the silicon nitride sintered body is disadvantageously increased.

As described above, the cost of the silicon nitride material powder manufactured through the direct nitriding method is relatively low. Further, when the amounts of rare earth element, aluminum component and silicon carbide or the like contained in the silicon nitride material powder are controlled to be within predetermined ranges, there can be manufactured a silicon nitride sintered body excellent in mechanical strength, wear resistance and rolling life property or the like, especially excellent in workability.

PRIOR ART LITERATURES

Patent Literatures

Patent Literature 1: Japanese Patent Application (Publication) No. 06-080470

Patent Literature 2: International Patent Application (Publication) No. WO2005/030674

SUMMARY OF THE INVENTION

Problems to be Solved by the Invention

However, thus manufactured silicon nitride sintered bodies exhibit a dispersion (scattering) in its characteristics, so that when the these silicon nitride sintered bodies are used as wear resistant members under a more severe condition, there has been posed a problem that there may be some sintered bodies having insufficient characteristics. Further, since there is the dispersion in characteristics as described above, some sintered bodies are liable to be damaged during a working process or the like when the sintered bodies are worked to be wear resistant members, so that there has been posed a serious problem of lowering a production yield at the manufacturing process of the wear resistant member.

Further, in a case where the silicon nitride sintered bodies are used as the wear resistant member, a grinding work is an essential process. However, since the silicon nitride sintered body having a high density is a hard material which has a difficulty in conducting grinding work, a load of the grinding work is large, so that a large number of man-hour and working time are required.

The present invention had been achieved to address the problems described above. Accordingly, an object of the present invention is to provide a wear (abrasion) resistant member comprising a silicon nitride sintered body capable of being manufactured with a low cost and also capable of suppressing the dispersion in characteristics. In particular, the object of the present invention is to provide the wear resistant member for which the load of the grinding work can be reduced. Another object of the present invention is to provide a method of efficiently manufacturing such the wear resistant member.

Means for Solving the Problems

In order to achieve the aforementioned objects, one embodiment of the present invention provides a wear resistant member formed of ceramics sintered body mainly composed of silicon nitride sintered body, the ceramics sintered body containing 10 to 3500 ppm of an Fe component in terms of Fe element, more than 1000 ppm to 2000 ppm of a Ca component in terms of Ca element, and 1 to 2000 ppm of a Mg component in terms of Mg element, wherein a β-phase ratio of silicon nitride crystal grains is 95% or more, a maximum longer diameter of the silicon nitride crystal grains is 40 μm or less, Ca component existing in grain boundary phase is not detected by XRD (X-ray Diffraction method), and each of dispersions in (Vickers) hardness, fracture toughness and density of an inner portion of the wear resistant member is within a range of ±10%.

It is preferable that a Mg component existing in the grain boundary phase of the ceramic sintered body is not detected by XRD. Further, it is also preferable that the ceramic sintered body contains 0.1 to 5 mass % of at least one element selected from the group consisting of Ti, Zr, Hf, W, Mo, Ta, Nb, and Cr. Furthermore, it is also preferable that the aforementioned ceramic sintered body contains 1 to 5 mass % of a rare earth component in terms of the rare earth element, and 1 to 5 mass % of an Al component in terms of Al element.

In addition, it is also preferable that the ceramic sintered body has a Vickers hardness of 1400 or more. Further, it is also preferable that an average aspect ratio, which is defined as an average value of respective aspect ratios of silicon nitride crystal grains constituting the wear resistant member, is 2 or more. Furthermore, it is also preferable that the ceramic sintered body comprises a ground surface having a surface roughness (Ra) of 1 μm or less.

According to another embodiment of the present invention, there is provided a method of manufacturing a wear resistant member formed of ceramic sintered body mainly composed of silicon nitride, the method comprises the steps of: preparing a material powder mixture containing a silicon nitride material powder, a sintering agent powder, 10 to 3500 ppm of an Fe component in terms of Fe element, more than 1000 ppm to 2000 ppm of a Ca component in terms of Ca element, and 1 to 2000 ppm of a Mg component in terms of Mg element;

molding the material powder mixture thereby to form a molded body;

conducting a primary sintering operation to the molded body at a sintering temperature of 1600 to 1950° C. thereby to obtain a primary sintered body having a relative density of 80% or more and less than 98%;

cooling the primary sintered body wherein a cooling rate at a temperature range of the sintering temperature to 1400° C. is controlled to be 100° C./hour or more;

conducting a secondary sintering operation to the primary sintered body at a sintering temperature of 1600 to 1900° C. thereby to obtain a secondary sintered body having a relative density of 98% or more; and cooling the secondary sintered body wherein a cooling rate at a temperature range of the sintering temperature to 1400° C. is controlled to be 100° C./hour or more.

Further, it is also preferable that the secondary sintering operation is performed by conducting a hot isostatic pressing (HIP) method to the primary sintered body. Furthermore, it is also preferable that the ceramic sintered body contains 1 to 5 mass % of a rare earth component in terms of rare earth element and 1 to 5 mass % of an Al component in terms of Al element as sintering agent. Still further, it is also preferable that the method further comprises a step of grinding the ceramic sintered body so that a surface roughness Ra of the ceramic sintered body is controlled to be 1 μm or less.

Effects of the Invention

According to the wear resistant member of the present invention formed of ceramics sintered body mainly composed of silicon nitride sintered body, the ceramic sintered body contains 10 to 3500 ppm of an Fe component in terms of Fe element, more than 1000 ppm and 2000 ppm or less of a Ca component in terms of Ca element, and 1 to 2000 ppm of a Mg component in terms of Mg element, so that there can be provided a wear resistant member in which each of dispersions in density, hardness and fracture toughness of the wear resistant member is suppressed within a range of ±10%, and the wear resistant member also being excellent in reliability and a low-cost performance. Further, according to the present invention, it becomes possible to obtain an as-sintered surface (sintering-finished surface) which is easily ground.

Further, according to the method of manufacturing the wear resistant member, the wear resistant member is manufactured by: preparing a material powder mixture containing a silicon nitride material powder, a sintering agent powder, 10 to 3500 ppm of an Fe component in terms of Fe element, more than 1000 ppm to 2000 ppm of a Ca component in terms of Ca element, and 1 to 2000 ppm of a Mg component in terms of Mg element; molding the material powder mixture thereby to form a molded body; conducting a primary sintering operation to the molded body thereby to obtain a primary sintered body having a relative density of 80% or more and less than 98%; and conducting a secondary sintering operation to the primary sintered body thereby to obtain a secondary sintered body having a relative density of 98% or more, so that there can be easily manufactured a wear resistant member containing 10 to 3500 ppm of an Fe component, more than 1000 ppm to 2000 ppm of a Ca component, and 1 to 2000 ppm of a Mg component, and having dispersions in density, hardness and fracture toughness that are suppressed within a range of ±10%.

BEST MODE FOR CARRYING OUT THE INVENTION

Next, embodiments of the wear (abrasion) resistant member according to one embodiment of the present invention will be explained hereunder.

The present embodiment provides a wear resistant member formed of ceramic sintered body mainly composed of silicon nitride, the ceramic sintered body is characterized by containing 10 to 3500 ppm of an Fe component in terms of Fe element, more than 1000 ppm to 2000 ppm of a Ca component in terms of Ca element, and 1 to 2000 ppm of a Mg component in terms of Mg element, wherein a β-phase ratio of silicon nitride crystal grains is 95% or more, a maximum longer diameter of the silicon nitride crystal grains is 40 μm or less, Ca component existing in grain boundary phase is not detected by XRD (X-ray Diffraction method), and each of dispersions in (Vickers) hardness, fracture toughness and density of an inner portion of the wear resistant member is within a range of ±10%.

In a case where the contents of Fe component, Ca component or Mg component in the wear resistant member exceed the above range, a brittle segregated portion functioning as a starting point of fracture is disadvantageously generated, so that characteristics such as hardness, fracture toughness or the like of the wear resistant member become to be easily lowered. Therefore, when the wear resistant member is subjected to a surface working for manufacturing a wear resistant device or when the wear resistant member is actually used as the wear resistant member, exfoliation and crack are liable to occur.

On the other hand, in a case where the contents of Fe component, Ca component and Mg component are less than the above range, it is necessary to use a silicon nitride material powder having a high purity for manufacturing the wear resistant member, so that material cost is drastically increased, thus being economically disadvantageous.

In order to improve grindability (easiness of grinding work) as described later on, it is preferable that a content of Fe component is set to within a range of 100 to 2000 ppm in terms of Fe element, a content of Ca component is set to within a range of 1100 ppm to 1600 ppm in terms of Ca element, and a content of Mg component is set to within a range of 100 ppm to 1000 ppm in terms of Mg element. In this connection, a unit of "ppm" in the present invention means "mass %".

Namely, in the present invention, since the impurity contents such as Fe component, Ca component and Mg component are controlled to be within the above ranges, it becomes possible to use an inexpensive silicon nitride raw powder containing relatively large amount of Fe component, Ca component and Mg component as impurities. The inexpensive silicon nitride raw powder is manufactured through a direct nitriding method in which a metal Si is directly nitrided. The use of such raw material of low cost is very advantageous so as to greatly reduce the manufacturing costs of the wear resistant member.

Further, in the present invention, in spite of the large amounts of Fe component, Ca component and Mg component as impurities contained in the wear resistant member, the dispersions in hardness, fracture toughness and density are suppressed to be within a range of ±10%. Therefore, even in a case where the wear resistant members are used for a long period of time, a number of the wear resistant member causing the exfoliation or crack is few, so that there can be obtained a wear resistant member excellent in reliability.

Further, even if the ceramic sintered body contains Ca at an amount of more than 1000 ppm and 2000 ppm or less, Ca compound is not detected when an XRD analysis is performed. The "Ca compound is not detected by XRD analysis" means that a peak of Ca compound is not detected and the Ca compound is substantially changed into an amorphous phase.

Examples of the above Ca compound may include single substance of Ca, Ca oxide, reaction product of Ca and sintering agent, or the like. Further, the XRD analysis is performed under the conditions that a Cu target (CuKα) is used, an X-ray tube voltage is 40 kV, and an X-ray tube current is 100 mA. Further, the content of Ca component can be detected by means of ICP analysis (Inductivity-Coupled Plasma mass spectrometry).

Since the Ca compound is changed into the amorphous phase, a load of grinding work for the wear resistant member can be reduced. Since the load of grinding work can be reduced to be small, it becomes easy to obtain a plain ground-surface having a surface roughness Ra of 1 μm or less, further 0.1 μm Ra or less.

Further, it is preferable that a peak of Mg component existing in the grain boundary phase of the ceramic sintered body is not also detected by XRD analysis. The feature of that "the peak of Mg compound is not detected by XRD analysis" means that the Mg compound is substantially changed into an amorphous phase. Furthermore, examples of the above Mg compound may include single substance of Mg, Mg oxide, reaction product of Mg and sintering agent, and reaction product of Mg and Ca, or the like. Since the Mg compound is changed into the amorphous phase, the load of grinding work for the wear resistant member can be further reduced to be small.

Whether or not the Ca compound and the Mg compound are existing in the grain boundary phase can be confirmed by mean of an EPMA (Electron Probe Micro-Analysing) method using a color mapping technology.

Further, it is necessary to set a β-phase ratio of above the silicon nitride crystal grain of the ceramic sintered body (silicon nitride sintered body) to 95% or more. The β-phase type silicon nitride crystal grain has trigonal crystal, so that a high temperature strength of the wear resistant member can be increased. When the β-phase ratio of above the silicon nitride crystal grain is less than 95%, a strength of the ceramic sintered body is disadvantageously lowered.

In the present invention, a maximum longer diameter of silicon nitride crystal grain in the wear resistant member is preferably set to be 40 μm or less. In other words, it is preferable that a coarse silicon nitride crystal grain having a longer diameter exceeding 40 μm are not existing in the wear resistant member. In a case where the coarse silicon nitride crystal grain having a longer diameter exceeding 40 μm are existing in the wear resistant member, the coarse silicon nitride crystal grain functions as a starting point of crack, so that the fracture toughness is greatly decreased, and a mechanical strength of the sintered body is also lowered, thus being not preferable indeed.

In this regard, the maximum longer diameter of silicon nitride crystal grain is measured by the following manner. That is, the wear resistant member is cut and subjected to a mirror polishing the cut surface. Subsequently, the mirror-polished surface is subjected to an etching treatment there by to remove grain boundary component. Then, a unit area (100 μm×100 μm), which is arbitrarily selected from the etched surface, is taken a photograph by means of a scanning type electron microscope (SEM) at a magnification of ×5000 or more. The maximum longer diameter of silicon nitride crystal grain is the longest diameter of the respective crystal grains observed on the photograph. Accordingly, a requirement of the present invention is achieved when the coarse silicon nitride crystal grain having a longer diameter exceeding 40 μm is not observed on the photograph of the wear resistant member.

Further, in the wear resistant member of the present invention, it is also preferable that an average aspect ratio, which is defined as an average value of respective aspect ratios of silicon nitride crystal grains, is 2 or more. In a case where the aspect ratio is less than 2, a micro-structure of the wear resistant member would not be a structure in which silicon nitride crystal grains are formed in a complicated manner and complicatedly entangled to each other, so that a mechanical strength or the like of the wear resistant member is liable to easily become insufficient.

In this regard, an aspect ratio (=longer diameter/shorter diameter) of the silicon nitride crystal grain is obtained by the same above-mentioned method used for measuring the maximum longer diameter of the silicon nitride crystal grain. Namely, the wear resistant member is cut and subjected to a mirror polishing the cut surface. Subsequently, the mirror-polished surface is subjected to an etching treatment thereby to remove grain boundary component. Then, the unit area of surface is taken a photograph by means of a scanning type electron microscope (SEM). The longer diameter and a shorter diameter of a silicon nitride crystal grain observed on the photograph are measured. As a result, the aspect ratio is obtained as a ratio of the longer diameter to a shorter diameter. In addition, an average aspect ratio is obtained by averaging the respective aspect ratios of all the silicon nitride crystal grains observed in the unit area (100 μm×100 μm) revealed on the photograph.

Further, it is also preferable that the ceramic sintered body contains 1 to 5 mass % of a rare earth component in terms of the rare earth element, and 1 to 5 mass % of an Al component in terms of Al element as sintering agents. Due to existence of the sintering agents, a sintered body having a high density can be obtained. Examples of the rare earth element compound may include rare earth oxide, concretely, yttrium oxide, erbium oxide, ytterbium oxide, or the like. Further, as the Al component, aluminum oxide, aluminum nitride or the like are used. These components react with silicon nitride or the like in the ceramic sintered body thereby to produce a rare earth element-Si—Al—O—N type compound or the like existing as components constituting the grain boundary phase. The amounts of rare earth component and Al component are obtained by analyzing contents of the respective elements.

Furthermore, it is also preferable that the ceramic sintered body contains 0.1 to 5 mass % of at least one element selected from the group consisting of Ti, Zr, Hf, W, Mo, Ta, Nb, and Cr. These elements are effective for strengthening the grain boundary phase. Among these elements, Hf is the most preferable. Hf reacts with rare earth elements thereby to form a crystalline compound, so that Hf is effective for strengthening the grain boundary phase. The crystalline compound of Hf and rare earth element can be identified and detected by XRD analysis. Due to the strengthened grain boundary phase, the hardness and the fracture toughness of the sintered body can be further improved.

Further, the wear resistant member of the present invention has excellent properties such that a Vickers hardness (Hv) is of 1400 or more, and a fracture toughness is 5.5 MPa·m$^{1/2}$ more. In case of these wear resistant members having the high hardness and/or the high fracture toughness, the dispersions of the respective characteristics can be suppressed.

Further, even if the Vickers hardness (hv) is set to 1430 or more and the fracture toughness is set to 6.0 MPa·m$^{1/2}$ or more, it is also possible to suppress the dispersions of the respective characteristics.

Figure 1:
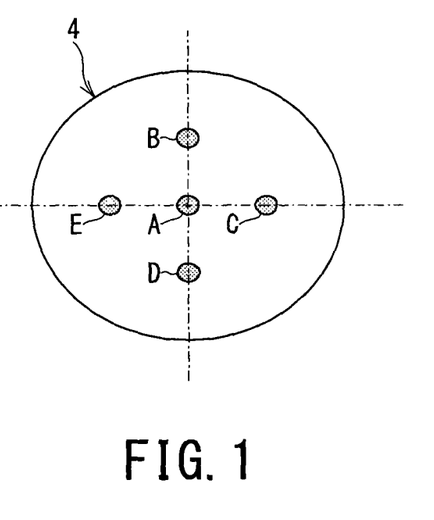
FIG. 1 is a cross-sectional view showing one embodiment of the wear resistant member according to the present invention in a case where the wear resistant member has a spherical shape, and showing points at which Vickers hardness, fracture toughness and density of the wear resistant member are measured.

In this connection, the dispersion in the Vickers hardness (Hv) or the fracture toughness or density is calculated as the following manner. FIG. 1 is a cross-sectional view showing an example of the wear resistant member having a spherical shape, and FIG. 2 is a plan view showing another example of the wear resistant member having a rectangular-plate shape.

In case of the wear resistant member 4 having a spherical shape as shown in FIG. 1, a center portion in the cross section is represented as A point, while intermediate four points of straight lines each connecting the center point A and peripheral end points of the wear resistant member 4 are represented respectively as B point, C point, D point and E point Vickers hardness (Hv), fracture toughness and density are measured respectively at 5 points of A-E points. The measured values are averaged to obtain the respective average values.

Figure 2:
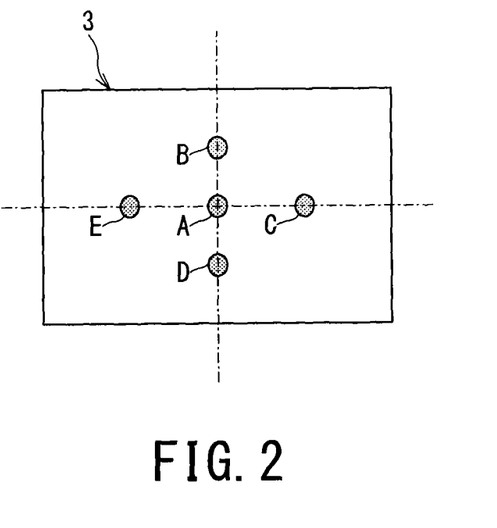
FIG. 2 is a plan view showing another embodiment of the wear resistant member according to the present invention in a case where the wear resistant member has a rectangular shape, and showing points at which Vickers hardness, fracture toughness and density of the wear resistant member are measured.

On the other hand, in case of the wear resistant member 3 having a rectangular plate shape as shown in FIG. 2, a center portion on a plain surface is represented as A point, while intermediate four points of straight lines each connecting the center point A and peripheral end points of the wear resistant member 3 are represented respectively as B point, C point, D point and E point. Vickers hardness (Hv), fracture toughness and density are measured respectively at 5 points of A-E points. The measured values are then averaged to calculate the average values of Vickers hardness (Hv), the fracture toughness and density.

Further, among a plurality of the measured values, a farthest value which is most numerically deviated from the average value (a farthest value which is most apart from the average value) is defined as a "most deviated value". Then, the measured average value and the most deviated value are put into a calculation formula (I) hereunder, thereby to calculate the respective dispersions.

$$\text{Dispersion [\%]}=[(\text{Average Value}-\text{Most Deviated Value})/\text{Average Value}]\times 100 \quad (1)$$

In this regard, the Vickers hardness was measured in accordance with a method prescribed in Japanese Industrial Standard (JIS R1610). In addition, the fracture toughness is measured by an IF method which is prescribed in Japanese Industrial Standard (JIS R1607).

Further, the dispersion of the density is measured as the following manner. That is, at first, test pieces are cut out from the five points (A to E points). Then, with respect to the respective test pieces, the densities are measured on the basis of Archimedes' principle, and averaging the measured values thereby to obtain an average density. Then, as the same manner as in the hardness and the fracture toughness, a dispersion (%) is calculated on the basis of the calculation formula (I). In the present invention, the dispersion of density in the wear resistant member is also set to within ±10%.

In this connection, it is preferable that the ceramic sintered body has a density of 3.18 g/cm$^3$ or more. Further, it is more preferable that the ceramic sintered body has a density of 3.25 g/cm$^3$ or more.

These wear resistant members of the present invention can be used as not only the rolling balls constituting the bearing or the like but also used as structural members for various applications requiring wear (abrasion) resistance. Example of the various applications may include a cutting tool, a rolling jig, a check ball of valve, engine parts, various jigs and tools, various rails, and various rollers. In particular, the wear resistant members of the present invention can be suitably applied to a large sphere (ball) body having a diameter of 3 mm or more, further 10 mm or more, and a large-sized member having a short-side length of 30 mm or more, further 100 mm or more.

The present invention can provide a wear resistant device. The wear resistant device of the present invention comprises the above wear resistant member, particularly, comprises a plurality of the above wear resistant members according to the present invention.

Concretely, the wear resistant device of the present invention comprises, for example, a bearing using the wear resistant member as rolling balls, or a device comprising this bearing. In these wear resistant device, since the dispersions in hardness and fracture toughness of the wear resistant member are limited to be within the range of ±10%, an amount of the wear resistant members causing damages such as exfoliation or crack or the like is few, so that a generation of vibration or the like can be suppressed for a long period of time, and the wear resistant member is excellent in reliability.

Further, according to the wear resistant device of this invention, it becomes possible to use aforementioned relatively inexpensive silicon nitride material powder containing large amounts of Fe component, Ca component and Mg component, for constituting the wear resistant member, so that a cost of the wear resistant device can be lowered to be relatively inexpensive.

In other words, it becomes possible to use the inexpensive silicon nitride material powder and the sintering agent powders each containing large amounts of Fe component, Ca component and Mg component as impurities, so that further cost-down effect can be obtained.

Further, in the present invention, when a grinding work is performed so as to obtain a ceramic sintered body having a surface roughness of 1 µm Ra or less, further 0.1 µm Ra or less, a load of grinding work can be decreased, Namely, when the grinding work is performed so as to obtain a silicon nitride sintered body having a surface roughness of 1 µm Ra or less, a grinding work using a diamond grinding stone (abrasive grains) is normally performed. In this case, in the wear resistant member of the present invention, Ca compound existing in the grain boundary phase exists as amorphous compound which is softer than a crystallized compound. The Ca component easily soaks out to a surface of the ceramic sintered body after the sintering step. Therefore, when the amorphous compound of the Ca compound is formed on the surface of the ceramic sintered body, the surface can be made to be easily ground. For this reason, a damage of the diamond grinding stone is few, and it is possible to reduce an amount of grinding (grinding margin) of the silicon nitride sintered body itself. In other words, the present invention is suitably applied to a wear resistant member having a ground surfaced.

Figure 3:
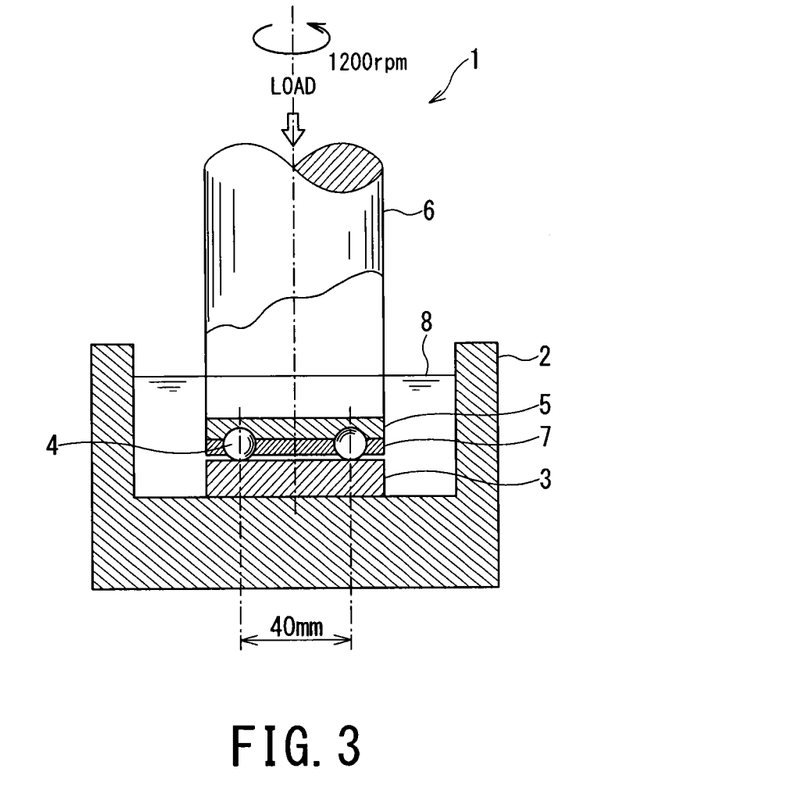
FIG. 3 is a cross-sectional view showing a structure of a thrust type rolling wear (abrasion) testing apparatus for measuring the rolling life characteristics of a wear (abrasion) resistant member according to the present invention.

The wear resistant member of the present invention may be, for example, a wear resistant member having an almost plate-shape as one embodiment, and a test surface of the wear resistant member is subjected to the grinding work so as to obtain a mirror surface. Then, such the plate-shaped wear resistant member is attached to a rolling wear testing apparatus 1 as shown in FIG. 3. Three SUJ2 rolling steel balls 4 each having a diameter of 9.35 mm and a surface state of five grade or higher are placed on a track having a diameter of 40 mm which is disposed on a top surface of the plate-shaped wear resistant member 3.

When these rolling steel balls 4 are rotated at 1200 rpm under a condition that a load is applied so as to apply a maximum contact stress of 5.9 GPa to the rolling balls, it is preferable that the rolling life, which is defined by the number of rotations that have been occurred by the time when the plate-shaped wear resistant member 3 is exfoliated, is preferably at least $2 \times 10^7$.

The wear resistant member of the present invention is, for example, a member having the rolling life of at least $2 \times 10^7$ which is equal to or longer than that of conventional wear resistant members.

The wear resistant member of the present invention can be also used, for example, as spherical member such as rolling ball (bearing ball) other than the aforementioned plate-shaped member.

In a case where the wear resistant member of the present invention is used as the rolling ball, a size of the rolling ball is not particularly limited, for example, the rolling ball having a diameter of 3 mm or more is suitably used. Further, when the diameter is set to 10 mm or more, further 20 mm or more, characteristics such as rolling life or the like can be remarkably improved in comparison with those of the conventional wear resistant members manufactured by conventional manufacturing method.

Further, when the diameter of the wear resistant member is set to relatively large, a difference in manufacturing prime cost becomes more notable in comparison with that of the spherical wear resistant member manufactured by using an expensive silicon nitride material powder synthesized through a conventional imide thermal decomposition method.

Further, the wear resistant member of the present invention is formed to provide spherical bodies each having a diameter of 9.35 mm. The spherical bodies are subjected to a grinding work.

Then, such the spherical bodies are attached to the rolling wear testing apparatus shown in FIG. 3. When three spherical wear resistant members (rolling balls) 4 each having a surface state of Grade-5 or more are placed on a track having a diameter of 40 mm disposed on the top surface of an SUJ2 steel plate of which testing surface is mirror-polished. Then, when the spherical wear resistant member 4 are rotated at 1200 rpm under a condition that a load is applied so as to apply a maximum contact stress of 5.9 GPa to the spherical wear resistant member 4, it is preferable that the rolling life, which is defined by the elapsed time until surfaces of the spherical wear resistant member 4 are exfoliated, is preferably at least 400 hours. The wear resistant member of the present invention has the above the rolling life of at least 400 hours which is equal to or longer than that of the conventional wear resistant members (rolling balls).

Next, a method of manufacturing the wear resistant member of the present invention will be explained hereunder.

The present invention provides a method of manufacturing a wear resistant member formed of ceramic sintered body mainly composed of silicon nitride, the method comprising the steps of:

preparing a material powder mixture containing a silicon nitride material powder, a sintering agent powder, 10 to 3500 ppm of an Fe component in terms of Fe element, more than 1000 ppm to 2000 ppm of a Ca component in terms of Ca element, and 1 to 2000 ppm of a Mg component in terms of Mg element;

molding the material powder mixture thereby to form a molded body;

conducting a primary sintering operation to the molded body at a sintering temperature of 1600 to 1950° C. thereby to obtain a primary sintered body having a relative density of 80% or more and less than 98%;

cooling the primary sintered body wherein a cooling rate at a temperature range of the sintering temperature to 1400° C. is controlled to be 100° C./hour or more;

conducting a secondary sintering operation to the primary sintered body at a sintering temperature of 1600 to 1900° C. thereby to obtain a secondary sintered body having a relative density of 98% or more; and cooling the secondary sintered body wherein a cooling rate at a temperature range of the sintering temperature to 1400° C. is controlled to be 100° C./hour or more.

In comparison with a method using conventional primary and secondary sintering steps, the method of the present invention adopts the primary sintering step in which the relative density of a sintered body is controlled to be relatively low of 80 to less than 98%, and adopts the secondary sintering step (densifying sintering step) in which the relative density of the sintered body is further advanced to 98% or more. When the above primary and secondary sintering steps are performed, even in a case where the amounts of Fe component, Ca component and Mg component are relatively large in the material powder mixture, there can be easily manufactured a wear resistant member which is excellent in hardness and fracture toughness, and dispersions in hardness and fracture toughness are suppressed within a range of ±10%.

Furthermore, after the primary and secondary sintering steps, the sintered body is rapidly cooled at a cooling rate of 100° C./h or more until the temperature of the sintered body is lowered to 1400° C., so that it becomes possible to prevent the Ca compound from changing into a crystalline compound.

As a silicon nitride raw material powder used for manufacturing the above wear resistant member, for example, a silicon nitride raw material powder containing 10 to 3500 ppm of an Fe component in terms of Fe element, more than 1000 to 2000 ppm of a Ca component in terms of Ca element and 1 to 2000 ppm of a Mg component in terms of Mg element is preferably used. As the silicon nitride material powder containing the Fe component, the Ca component and Mg component of within the above ranges, for example, an inexpensive silicon nitride raw material powder manufactured by a metal nitriding method can be suitably used.

Further, as the silicon nitride material powder, in consideration of the sintering characteristics such as the bending strength, and the fracture toughness or the like, there can be preferably used the silicon nitride material powder containing at least 80% by mass, preferably 90% to 97 mass % of α-silicon nitride containing 1.5 mass % or less, preferably 0.9% to 1.2 mass % of oxygen and has an average particle diameter of 1.2 µm or less, preferably about 0.6 to about 1.0 µm.

In this regard, a silicon nitride raw material powder is known to have an α-phase type and a β-phase type. A silicon nitride sintered body made from the β-phase type silicon nitride powder tends to have insufficient strength. In contrast, after the sintering operation, the α-phase type silicon nitride material powder is changed into a β-phase type silicon nitride crystal grains, so that there can be provided a high-strength sintered body wherein the silicon nitride crystal grains having a high aspect ratio are highly entangled.

Among the total amount of the α-phase type and the β-phase type silicon nitride material powders, when a blending ratio of the α-phase type silicon nitride material powder is controlled to be at least 80% by mass in the present inventive method, the bending strength, the fracture toughness and the rolling life of the wear resistant member can be improved. On the other hand, in consideration of the sintering characteristics, the blending ratio of the α-phase type silicon nitride material powder is limited to 97% by mass or less. Preferably, the amount of the α-phase type silicon nitride material powder is 90% to 95% by mass.

Further, as the silicon nitride material powder, in particular, use of a fine raw material powder having an average particle diameter of 0.8 µm or less can provide a densely sintered body having a porosity of 2% or less even using a smaller amount of sintering agent, thus being preferable. The porosity of this sintered body can easily be measured and determined according to Archimedes' principle.

It is preferable that the rare earth element is added to the silicon nitride raw material powder as a sintering aid (sintering agent). As the rare earth element, it is preferable that at least one element selected from the group consisting of Y, Ho, Er, Yb, La, Sc, Pr, Ce, Nd, Dy, Sm and Gd or the like is added to the silicon nitride raw material powder. These rare earth elements react with the silicon nitride raw material powder to generate a liquid phase, thus functioning as a sintering promoter (sintering agent).

It is preferable that an addition amount of the rare earth element is controlled to be 1 to 5 mass % with respect to an entire material powder mixture comprising the silicon nitride material powder and other sintering aids (hereinafter, referred to simply as "material powder mixture").

When the addition amount of the rare earth element is less than 1% by mass, the resultant wear resistant member has an insufficient density and strength. In particular, when the rare earth element has a high atomic weight as in a lanthanoid element, the wear resistant member will have a relatively low strength.

On the other hand, when the addition amount of the sintering aid exceeds 5% by mass, an excessive amount of grain boundary phases are generated. This may increase the number of pores or decrease the strength of the wear resistant member.

Further, it is also preferable that an aluminum component is added to the silicon nitride raw material powder. This aluminum component is preferably added as aluminum oxide ($Al_2O_3$) or aluminum nitride (AlN). Further, It is preferable that a total addition amount of these aluminum components is set within a range of 1 to 5 mass % in terms of Al element with respect to the entire material powder mixture.

The aluminum oxide ($Al_2O_3$) is added so as to enhance the function of the rare earth element as a sintering promoter, allows an increase in the density at low sintering temperature, control the grain growth in the crystal structure, and increase the mechanical strength, such as the bending strength and the fracture toughness or the like of a wear resistant member.

It is preferable that an addition amount of the aluminum oxide is controlled to within a range of 4 mass % or less with respect to the entire material powder mixture in a case where the aluminum oxide is cooperatively used together with AlN. When the addition amount of the aluminum oxide is more than 4 mass %, the oxygen content is increased in the sintered body. The increased oxygen content causes a non-uniform distribution of components existing in a grain boundary phase and decreases the rolling life of the wear resistant member, thus being not preferable.

In contrast, when the addition amount of the aluminum oxide ($Al_2O_3$) is less than 2 mass %, the resulting effects caused by adding $Al_2O_3$ is insufficient, so that it is preferable that the addition amount of the aluminum oxide is controlled to be 2 mass % or more. In view of the above viewpoint, the addition amount of the aluminum oxide (Al₂O₃) is more preferably set to a range of 2 mass % to 3.5 mass % or less.

On the other hand, aluminum nitride (AlN) is added desirably at 3% by mass or less with respect to the entire material powder mixture so as to prevent or reduce the evaporation of a silicon nitride component during the sintering operation and enhance the function of the rare earth element as a sintering promoter. However, the addition amount of more than 3% by mass of AlN decreases the mechanical strength and the rolling life of the wear resistant member, thus being not preferable. In contrast, when the addition amount of the aluminum nitride (AlN) is less than 1 mass %, the above function caused by adding AlN is insufficient. Thus, the addition amount of AlN is preferably controlled to be 1% by mass or more.

In this regard, the addition of both 2% to 4% by mass of Al₂O₃ and 1% to 3% by mass of AlN to the silicon nitride material powder can more effectively improve the mechanical characteristics of a wear resistant member. However, an excessive total amount of Al₂O₃ and AlN decreases the rolling life of the wear (abrasion) resistant member. Thus, the total content of the aluminum components in the raw material powder mixture is preferably set to 6% by mass or less (oxide equivalent).

On the other hand, it is preferable that at least one compound selected from the group consisting of oxide, carbide, nitride, silicide, and boride of Ti, Hf, Zr, W, Mo, Ta, Nb, and Cr is added to the silicon nitride raw material powder. These compounds enhance the function of the rare earth oxide or the like as a sintering promoter, promotes the dispersion in the crystal structure, and improves the mechanical strength and the rolling life of the wear resistant member comprising a sintered silicon nitride. Among these compounds, Ti, Mo, and Hf compounds are particularly preferred.

When the addition amount of these compounds such as Ti or the like with respect to the entire material powder mixture is less than 0.1 mass % in terms of element thereof, the function caused by adding the compounds is insufficient. On the other hand, when the addition amount exceeds 5 mass %, the mechanical strength and the rolling life of the wear resistant member are decreased. Thus, the addition amount of the compound is limited to a range of 0.1 to 5% by mass. More desirably, the amount of the compound is particularly limited to a range of 0.5% to 2% by mass.

Further, silicon carbide (SiC) may be also added to the silicon nitride raw material powder. The silicon carbide (SiC) is dispersed as individual particles in a crystal structure and remarkably improves the rolling life of wear resistant member.

When the addition amount of the silicon carbide with respect to the entire material powder mixture is less than 2 mass %, the effect caused by adding the silicon carbide is insufficient. On the other hand, when the addition amount exceeds 7 mass %, the sintered body results in an insufficient densification and decreases the bending strength of the wear resistant member. Thus, the amount of silicon carbide is preferably limited to within a range of 2% to 7% by mass. By the way, silicon carbide can be divided into an α-type and a β-type, both of which exhibit the same operational effects, so that silicon carbide of either one of type can be added.

The wear resistant member according to the present invention is manufactured through, for example, the following processes. That is, above described raw material powder mixture is prepared by adding predetermined amounts of required additives, such as a sintering aid comprising the rare earth element, if necessary, aluminum component such as aluminum oxide (Al₂O₃) and/or aluminum nitride (AlN), and optional compound such as Ti or the like, to a silicon nitride fine powder as described above. Further, an organic binder component is added to this raw material powder mixture thereby to prepare granulated powder.

At this time, in a case where predetermined amounts of Fe component, Ca component and Mg component are not contained in the raw material powder mixture in advance, the raw material powder mixture is prepared by making up shortfalls of the respective components.

Then, thus obtained granulated powder is molded into a compact (molded body) having a predetermined shape. As a method of molding the granulated powder, a general-purpose molding-die pressing method and CIP (cold isostatic pressing) method or the like are suitably used.

In case of the formation of a compact (molded body) by the molding-die pressing method or the CIP molding method, the granulated powder is preferably molded at a pressure of 120 MPa or more to form a grain boundary phase in which pores and voids are hardly formed particularly after sintering operation.

When the molding pressure is less than 120 MPa, a cohesive portion (segregated portion) composed of a rare earth element compound, which principally forms a grain boundary phase, is easily formed. In addition, the resulting molded body has an insufficient density, and the wear resistant member easily generates a lot of cracks.

On the other hand, when the molding pressure is set to exceed 200 MPa, the durability of a molding die is decreased, so that a productivity is not good. Thus, the molding pressure is preferably set to a range from 120 to 200 MPa.

Subsequently, the molded body (molded compact) is heated at a temperature of 600° C. to 800° C. in a non-oxidizing atmosphere or at a temperature of 400° C. to 500° C. in the air for one to two hours to remove the organic binder component sufficiently and degrease the molded body.

Then, the degreased molded body is subjected to a primary sintering step in a non-oxidizing atmosphere of an inert gas such as a nitrogen gas whereby a relative density of the resultant primary sintered body is controlled to be 80% or more and less than 98%.

Thereafter, the resultant primary sintered body is further subjected to a secondary sintering step in the non-oxidizing atmosphere so that the relative density of the resultant secondary sintered body is controlled to be 98% or more, thereby to form a silicon nitride sintered body (a wear resistant member). In this regard, the relative density of a sintered body is defined as a ratio (%) of an actual density measured on the basis of Archimedes' principle with respect to a theoretical density of the silicon nitride sintered body.

As a method of obtaining the theoretical density, the theoretical density can be simply obtained by the following simplified method. For example, according to a Physical-Chemistry Dictionary or the like, there is described that a theoretical density of silicon nitride is 3.185 g/cm³, that of yttrium oxide (Y₂O₃) is 5.03 g/cm³, aluminum oxide (Al₂O₃) is 4.0 g/cm³, and magnesium oxide (MgO) is 3.58 g/cm³.

The theoretical density of the silicon nitride sintered body can be also calculated by converting Y content into yttrium oxide, Al component into aluminum oxide, Mg component into magnesium oxide, as follows.

Theoretical Density of Silicon Nitride Sintered Body=
(Mass of Silicon Nitride×Theoretical Density+
Mass of Yttrium Oxide×Theoretical
Density+ . . . )

For example, when assuming that the contents of the respective components are 92 mass % of silicon nitride, 5 mass % of yttrium oxide and 3 mass % of aluminum oxide, a theoretical density of the silicon nitride sintered body having the above composition is calculated by the following calculation formula.

(Mass of Silicon Nitride:0.92×3.185+Mass of Yttrium Oxide:0.05×5.03+Mass of Aluminum Oxide: 0.03×4.0)=3.3017 g/cm$^3$ As described above, according to the present invention, the molded body is sintered in the primary sintering step so as to obtain a relative density of 80 to 98% or less which is lower than that of a sintered body manufactured by conventional manufacturing method. Thereafter, the sintered body is further sintered in the secondary sintering step so as to mainly increase the relative density of the sintered body. As a result, the dispersions in hardness and fracture toughness of the silicon nitride sintered body (wear resistant member) can be suppressed to within a range of ±10%.

Further, after the primary and secondary sintering steps, a cooling step is performed. In the cooling step, the sintered body is rapidly cooled at a cooling rate of 100° C./h or more until the temperature of the sintered body is lowered to 1400° C. When the rapidly cooling step is performed at the cooling rate of 100° C./h or more, the grain boundary phase can be changed into an amorphous phase. When the grain boundary phase is changed into the amorphous phase, it becomes possible to prevent the Ca compound from changing into a crystalline compound.

An upper limit of the above cooling rate is not particularly limited, however, a cooling rate of 500° C./h or less is preferable. The sintering temperature is 1600° C./h or more, so that if the cooling step is performed at a cooling rate exceeding 500° C., a load for a cooling facility becomes large.

The reason why the temperature range to be controlled is set to a range from the sintering temperature to 1400° C. is as follows. That is, when the rare earth element compound and Al component are used as the sintering agent, these components once form a liquid phase. Thereafter, until the temperature 1400° C., the liquid phase is solidified thereby to completely change into the grain boundary phase. In this connection, there is no need to conduct a particular control of the cooling rate at the temperature range of 1400° C. or less.

Further, when controlling such the cooling rate, not only a uniform grain boundary phase can be formed but also a dispersion of the density can be reduced.

Further, there can be obtained excellent characteristics such that the a Vickers hardness is 1400 or more, and a fracture toughness of 5.5 MPa·m$^{1/2}$ or more, preferably, the Vickers hardness is 1430 or more, and the fracture toughness of 6.0 MPa·m$^{1/2}$ or more. In addition, a dispersion of the hardness or the fracture toughness can be suppressed to within a range of ±10%.

That is, when the relative density is set to less than 80% or larger than 98% in the primary sintering step, it becomes difficult to suppress the dispersions in Vickers hardness and the fracture toughness of the silicon nitride sintered body (wear resistant member) to be within a range of ±10% even if the relative density is set to 98% or more in the secondary sintering step.

In the present invention, from viewpoints that the density of the silicon nitride sintered body is set to a high density at the completion of the aforementioned secondary sintering step; and the dispersions in hardness and the fracture toughness of the silicon nitride sintered body are suppressed to be within the range of ±10%, it is preferable that the density of the sintered body should be set to within a range of 85% to less than 98% at a stage of the primary sintering step.

In order to achieve the relative density of 80 to less than 98% of the sintered body after completion of the primary sintering step, a normal pressure sintering operation or pressure sintering operations should be performed at a temperature range of, for example, 1600° C. to 1950° C. for 2-8 hours, more preferably 1700° C. to 1850° C. for 2-6 hours.

When the above sintering temperature at the primary sintering step is lower than the lower limit of the above temperature range or when the sintering time at the primary sintering step is less than the lower limit of the above time range, it becomes difficult to set the density of a primary sintered body to be 80% or more at a stage of completion of the primary sintering step.

Further, in a case where the sintering temperature in the primary sintering step exceeds the upper limit of the above temperature range or where the sintering time in the primary sintering step exceeds the upper limit of the above time range, a sintering is excessively advanced at the primary sintering step, so that there may be a fear that the density of the resultant primary sintered body exceeds 98%.

Further, the secondary sintering step is preferably performed by conducting, for example, a hot isostatic pressing (HIP) treatment in which the primary sintered body is further sintered at a temperature of 1600 to 1900° C. for 0.5 to 2 hours under a state where the primary sintered body is applied with pressing force of 70 MPa or more, preferably 100 MPa or more.

When the above sintering temperature at the secondary sintering step is lower than the lower limit of the above temperature range or when the pressing force is lower than the above range, or when the sintering time at the secondary sintering step is less than the lower limit of the above time range, there may be a fear that the relative density of the resulting silicon nitride sintered body (secondary sintered body) at a stage of completion of the secondary sintering step would not become high density of 98% or more. In addition, there may be also a fear that it becomes difficult to suppress the dispersions in hardness, fracture toughness, and density of the silicon nitride secondary sintered body to be within the range of ±10%.

On the other hand, when the sintered temperature exceeds the upper limit of the above temperature range, there may be a fear that silicon nitride component is liable to be evaporated and decomposed.

Further, in a case where the sintering time exceeds the upper limit of the above time range, there may be a fear that the relative density is not further improved and a densification effect is saturated, so that the manufacturing time (process time) is increased, thus being not preferable.

Furthermore, when the temperature for the primary and the secondary sintering operations is set to a high temperature to be 1600° C. or more, the sintering agent is changed into a liquid component, and, for example, Ca component contained in the silicon nitride powder is soaked out to the liquid phase, so that there can be formed a state where Ca compound is existing on as-sintered surface of the sintered body.

As described above, according to the method of manufacturing the wear resistant member of this invention, when using a material powder mixture containing 10 to 3500 ppm of an Fe component, more than 1000 ppm to 2000 ppm or less of a Ca component and 1 to 2000 ppm of an Mg component, further the sintering operations are separately performed at two stages, it becomes possible to manufacture a silicon nitride sintered body (wear resistant member) in which the dispersions in hardness and the fracture toughness of the silicon nitride sintered body are suppressed to be within the range of ±10%.

Further, according to the method of manufacturing the wear resistant member of this invention, for example, there can be manufactured a silicon nitride sintered body (wear resistant member) in which a longer diameter of the silicon nitride crystal grain is 40 μm or less and an average aspect ratio of 2 or more, preferably 4 or more.

Further, if necessary, thus obtained ceramic sintered body is subjected to a grinding work. In a case where the ceramic sintered body is used as the wear resistant member, it is preferable to conduct a mirror-surface grinding work so as to obtain a surface roughness Ra of 1 μm or less, further 0.1 μm or less. The grinding work is performed by using a diamond grinding stone. At this time, when Ca compound exists on the as-sintered surface of the ceramic sintered body, a hardness of the as-sintered surface can be somewhat lowered. Therefore, a grinding time can be shortened and a damage of the diamond grinding stone can be also reduced, so that the load of the grinding work can be lowered.

Further, when Ca compound is configured to exist on the as-sintered surface, a grinding margin (amount of sintered body to be ground) can be reduced. Therefore, in a case where the mirror-surface grinding work is conducted so as to obtain the surface roughness Ra of 1 μm or less, further 0.1 μm or less, the grinding margin is small in comparison with that of the conventional sintered body, so that the mirror-polished surface can be obtained without discharging a wasteful material.

Furthermore, according to the method of manufacturing the wear resistant member of this invention, in a case where the wear resistant member has a plate-shape, it is possible to manufacture the plate-shaped wear resistant member having a rolling life of $2 \times 10^7$ or more, the rolling life being defined by a predetermined operation. Furthermore, in a case where the wear resistant member has a spherical shape, it is possible to manufacture the spherical-shaped wear resistant member having a rolling life of 400 hours or more, the rolling life being defined by a predetermined operation.

EMBODIMENTS

Next, embodiments of the present invention will be specifically explained in detail with reference to the following examples and comparative examples described below.

Examples 1-7 and Comparative Examples 1-4

There were prepared a plurality kinds of $Si_3N_4$ (silicon nitride) material powders that were manufactured by metal nitriding method and each of the material powders contains different amounts of Fe component (10-3500 ppm in terms of Fe element), Ca component (50-2000 ppm in terms of Ca element) and Mg component (10-2000 ppm in terms of Ca element) as shown in Table 1.

These silicon nitride material powders were mixed with $Y_2O_3$ (yttrium oxide) powder, $Al_2O_3$ (aluminum oxide) powder, AlN (aluminum nitride) powder and $HfO_2$ (hafnium oxide) powder as sintering promoters (sintering agents), thereby to prepare material powder mixtures each containing Fe component, Ca component and Mg component at amounts shown in Table 1.

In this connection, in a case where the amounts of Fe, Ca and Mg are insufficient in the silicon nitride material powders, the amounts are controlled by further adding oxides into the silicon nitride material powders so as to attain the content values shown in Table 1.

In this regard, as the silicon nitride material powders and the sintering promoter powders each having an average grain size of 0.3 to 1.5 μm were used. Further, in the material powder mixture, the content of $Y_2O_3$ was 3 mass %, that of AlN is 2 mass %, $HfO_2$ is 1 mass %, and a balance is silicon nitride material powder.

By the way, material powders other than the silicon nitride material powder, i.e. each of $Y_2O_3$ powder, $Al_2O_3$ powder, AlN powder and $HfO_2$ powder as sintering promoters contain Fe component, Ca component and Mg component at an amount of 10 ppm or less.

Each of the material powder mixtures was wet pulverized (blended and ground) in ethyl alcohol using silicon nitride balls as a grinding medium for 48 hours and was then dried to prepare uniform material powder mixtures. Further, an organic binder was added to each of the uniform material powder mixtures thereby to prepare blended-granulated powders.

TABLE 1

| Sample No. | Material Powder Mixture | | | Silicon Nitride Material Powder Content | Sintering Agent Powder Content |
| --- | --- | --- | --- | --- | --- |
| | Fe Content (ppm) | Ca Content (ppm) | Mg Content (ppm) | | |
| Example 1 | 10 | 1050 | 10 | Balance | $Y_2O_3$ (3 mass %) |
| Example 2 | 100 | 1200 | 50 | | $Al_2O_3$ (3 mass %) |
| Example 3 | 1000 | 1300 | 100 | | AlN (2 mass %) |
| Example 4 | 2000 | 1500 | 500 | | $HfO_2$ (1 mass %) |
| Example 5 | 3500 | 2000 | 2000 | | |
| Example 6 | 100 | 1100 | 100 | | |
| Example 7 | 200 | 1600 | 100 | | |
| Comparative Example 1 | 100 | 50 | 50 | | |
| Comparative Example 2 | 2000 | 500 | 500 | | |
| Comparative Example 3 | 100 | 50 | 50 | | |
| Comparative Example 4 | 2000 | 500 | 500 | | |

Next, each of the blended-granulated powders was press-molded at a molding pressure of 150 MPa thereby to prepare a plurality of molded bodies. Subsequently, these molded bodies were degreased in air-flowing atmosphere having a temperature of 450° C. for 4 hours. Thereafter, each of the degreased molded bodies was subjected to a primary sintering step (operation) under the sintering conditions shown in Table 2 in a nitrogen gas atmosphere having pressure of 0.7 MPa, thereby to form the respective primary sintered bodies.

Further, each of the primary sintered bodies was then subjected to a secondary sintering step under the sintering conditions shown in Table 2, thereby to manufacture the respective secondary sintered bodies and to provide the respective wear resistance members composed of the silicon nitride sintered bodies.

In this connection, above the secondary sintering step was performed as a hot isostatic pressing (HIP) method in which the primary sintered body was applied with a pressing force of 100 MPa in a nitrogen gas atmosphere.

A density (relative density) of the sintered body after the primary sintering step and a density (relative density) of the sintered body after the secondary sintering step were measured. The respective measured results are shown in Table 2 hereunder. In this connection, each of the density (relative density) (%) of the sintered bodies was measured as a ratio (%) of an actual density measured by Archimedes' principle with respect to a theoretical density of the silicon nitride sintered body.

TABLE 2

| Sample No. | Primary Sintering | | | Secondary Sintering (HIP) | | |
|---|---|---|---|---|---|---|
| | Temp. × Time (° C.) × (h) | Cooling Rate (° C./h) | Relative Density of Sintered Body (%) | Temp. × Time (° C.) × (h) | Cooling Rate (° C./h) | Relative Density of Sintered Body (%) |
| Example 1 | 1820 × 4 | 100 | 94 | 1700 × 1 | 100 | 99 or more |
| Example 2 | 1820 × 4 | 120 | 95 | 1700 × 1 | 200 | 99 or more |
| Example 3 | 1800 × 4 | 300 | 94 | 1750 × 1 | 150 | 99 or more |
| Example 4 | 1780 × 4 | 450 | 93 | 1700 × 1 | 200 | 99 or more |
| Example 5 | 1850 × 4 | 200 | 96 | 1750 × 1 | 250 | 99 or more |
| Example 6 | 1800 × 6 | 250 | 97 | 1800 × 1 | 120 | 99 or more |
| Example 7 | 1800 × 2 | 180 | 85 | 1700 × 1 | 300 | 99 or more |
| Comparative Example 1 | 1850 × 4 | 50 | 98 | 1700 × 1 | 50 | 99 or more |
| Comparative Example 2 | 1850 × 4 | 50 | 98 | 1700 × 1 | 50 | 99 or more |
| Comparative Example 3 | 1750 × 4 | 100 | 79 | 1700 × 1 | 100 | 99 or more |
| Comparative Example 4 | 1750 × 4 | 100 | 79 | 1700 × 1 | 100 | 99 or more |

In this connection, the density of the sintered bodies, that were measured by Archimedes' principle, ranged from 3.10 g/cm$^3$ to 3.26 g/cm$^3$. Concretely, actually measured values of the sintered bodies were as follows. In Example 1, the primary sintered body had a density of 3.24 g/cm$^3$ while the secondary sintered body had a density of 3.26 g/cm$^3$. In Example 1, the primary sintered body had a density of 3.24 g/cm$^3$ while the secondary sintered body had a density of 3.26 g/cm$^3$. In Example 2, the primary sintered body had a density of 3.24 g/cm$^3$ while the secondary sintered body had a density of 3.26 g/cm$^3$. In Example 3, the primary sintered body had a density of 3.24 g/cm$^3$ while the secondary sintered body had a density of 3.26 g/cm$^3$. In Example 4, the primary sintered body had a density of 3.16 g/cm$^3$ while the secondary sintered body had a density of 3.18 g/cm$^3$. In Example 5, the primary sintered body had a density of 3.23 g/cm$^3$ while the secondary sintered body had a density of 3.25 g/cm$^3$. In Example 6, the primary sintered body had a density of 3.25 g/cm$^3$ while the secondary sintered body had a density of 3.28 g/cm$^3$. In Example 7, the primary sintered body had a density of 3.14 g/cm$^3$ while the secondary sintered body had a density of 3.16 g/cm$^3$.

In Comparative Example 1, the primary sintered body had a density of 3.12 g/cm$^3$ while the secondary sintered body had a density of 3.15 g/cm$^3$. In Comparative Example 2, the primary sintered body had a density of 3.12 g/cm$^3$ while the secondary sintered body had a density of 3.13 g/cm$^3$. In Comparative Example 3, the primary sintered body had a density of 3.10 g/cm$^3$ while the secondary sintered body had a density of 3.14 g/cm$^3$. In Comparative Example 4, the primary sintered body had a density of 3.10 g/cm$^3$ while the secondary sintered body had a density of 3.15 g/cm$^3$.

Further, in the silicon nitride sintered bodies of Examples 1-7 and Comparative Examples 1-2, β-phase ratio of the silicon nitride crystal grains was 95 to 98%. On the other hand, in the silicon nitride sintered bodies of Comparative Examples 3-4, the β-phase ratio of the silicon nitride crystal grains was 90 to 92%.

Next, with respect to thus manufactured wear resistant members according to each of Examples and Comparative Examples, a Vickers hardness, a fracture toughness value, and an average value thereof, a dispersion thereof, and a rolling life were measured.

In this regard, the Vickers hardness was measured in accordance with a method prescribed in Japan Industrial Standard (JIS-R-1610). An average value of the Vickers hardness of the wear resistant members 3 according to each Examples and Comparative Examples was obtained by averaging five measured values measured at five measuring points of A to E shown in FIG. 2. Further, a dispersion in Vickers hardness is obtained by the following manner. Namely, among the measured 5 values, a farthest value which is most numerically deviated from the average value (a farthest value which is most apart from the average value) is defined as a "most deviated value". Then, the measured average value and the most deviated value are put into a calculation formula hereunder, thereby to calculate the dispersion in Vickers hardness.

Dispersion [%]=[(Average Value−Most Deviated Value)/Average Value]×100

In addition, the fracture toughness is measured in accordance with an IF method which is prescribed in Japanese Industrial Standards (JIS-R-1607). Further, an average value and a dispersion of fracture toughness are obtained through the same method as those of Vickers hardness.

The rolling life of each of the respective wear (abrasion) resistant members was measured by using a thrust-type rolling wear (abrasion) testing apparatus 1 as illustrated in FIG. 3. The thrust-type rolling wear testing apparatus 1 is configured by comprising: a plate-shaped wear (abrasion) resistant member 3 disposed in a main body 2 of the testing apparatus 1; three of rolling steel balls 4 disposed on an upper surface of the wear resistant member 3; a guide plate 5 disposed on the rolling steel balls 4; a drive shaft 6 connected to the guide plate 5; and a holder (retainer) 7 for defining the interval between the respective rolling steel balls 4. The main body 2 is filled with a lubricating oil 8 for lubricating a rolling portion.

In this measuring operation, as the plate-shaped wear (abrasion) resistant member 3 for the thrust-type rolling wear (abrasion) testing apparatus 1, a test sample which was formed by working each of the wear resistant members of Examples and Comparative Examples into a sample having dimension of 70 mm×70 mm×3 mm (thickness) was used. At this time, a surface roughness (Ra) of the plate-shaped member (wear resistant member) 3 was set to 0.01 μm. Further, as the rolling balls 4 for the thrust-type rolling wear (abrasion) testing apparatus 1, spherical balls each composed of SUJ2 and having a diameter of 9.35 mm were used.

In this thrust-type rolling wear testing apparatus, the SUJ2 rolling balls 4 were applied with a load so as to be applied with a maximum contact stress of 5.9 GPa. Under this condition, these rolling balls 4 were rotated at 1200 rpm. Then, number of rotations, that had been occurred by the time when a surface of the plate-shaped member 3 composed of the wear resistant member was exfoliated, was measured. In this regard, the rotation number was measured by setting an upper limit to $3\times10^7$ as a maximum rotation number. Table 3 shows the measured results.

TABLE 3

| Sample No. | Vickers' Hardness (Hv) | | Fracture Toughness (MPa·m$^{1/2}$) | | Dispersion of Density (%) | Rolling Life (Plate Member) |
|---|---|---|---|---|---|---|
| | Average | Dispersion | Average | Dispersion | | |
| Example 1 | 1450 | ±1% | 6.3 | ±4% | ±0.2 | $3 \times 10^7$ cycles |
| Example 2 | 1450 | ±3% | 6.3 | ±5% | ±0.3 | $3 \times 10^7$ cycles |
| Example 3 | 1470 | ±5% | 6.3 | ±7% | ±0.2 | $3 \times 10^7$ cycles |
| Example 4 | 1420 | ±8% | 6.2 | ±7% | ±0.2 | $3 \times 10^7$ cycles |
| Example 5 | 1440 | ±8% | 6.2 | ±5% | ±0.5 | $3 \times 10^7$ cycles |
| Example 6 | 1460 | ±2% | 6.3 | ±3% | ±0.2 | $3 \times 10^7$ cycles |
| Example 7 | 1440 | ±2% | 6.1 | ±6% | ±0.2 | $3 \times 10^7$ cycles |
| Comparative Example 1 | 1480 | ±13% | 6.2 | ±5% | ±0.4 | $3 \times 10^7$ cycles |
| Comparative Example 2 | 1450 | ±16% | 6.0 | ±9% | ±0.2 | $3 \times 10^7$ cycles |
| Comparative Example 3 | 1430 | ±14% | 5.7 | ±15% | ±0.8 | $1.5 \times 10^7$ cycles |
| Comparative Example 4 | 1410 | ±18% | 5.5 | ±17% | ±0.5 | $1 \times 10^7$ cycles |

As is clear from the results shown in above Table 3, in the wear resistant members according to the respective Examples 1-7, in which the primary sintering step was performed so as to attain a relative density of 80 to less than 98% and the secondary sintering step was performed so as to attain a relative density of 98% or more, it was confirmed that the dispersions in both Vickers hardness and fracture toughness were controlled to be within a range of ±10%.

Further, it was also confirmed that all of the rolling life of each of plate-shaped wear resistant members according to Examples 1-7 exceeded $3\times10^7$ cycles and the wear resistant members were excellent in also the rolling life.

Next, with respect to thus manufactured wear resistant members according to each of Examples and Comparative Examples, a maximum value of longer diameter of the silicon nitride crystal grains was measured, while an average aspect ratio of the silicon nitride crystal grains was calculated.

A maximum value of the longer diameter of silicon nitride crystal grains was measured by the following manner. That is, the wear resistant member was cut Subsequently, a unit area (100 μm×100 μm) arbitrarily selected from the cut surface was taken a photograph by means of a scanning type electron microscope (SEM) at a magnification of ×5000 or more. A silicon nitride crystal grain having a maximum longer diameter is selected within the unit area observed on the photograph, and a longer diameter of the selected silicon nitride crystal grain was measured, so that the measured longer diameter was defined as the maximum value of the longer diameter.

Further, the average aspect ratio was calculated by the following manner. Namely, with respect to all of the silicon nitride crystal grains existing within the above unit area observed on the photograph, the longer diameter and the shorter diameter were measured thereby to obtain an aspect ratio from the longer diameter and the shorter diameter with respect to each of the silicon nitride crystal grains. As a result, the average aspect ratio was calculated by averaging the respective aspect ratios. Table 4 shows the measured results.

TABLE 4

| Sample No. | Maximum Value of Longer Diameter of Silicon Nitride Crystal Grain (μm) | Average Aspect Ratio |
|---|---|---|
| Example 1 | 14 | 5 |
| Example 1 | 18 | 6 |
| Example 1 | 20 | 6 |
| Example 1 | 25 | 7 |
| Example 1 | 24 | 7 |
| Example 1 | 32 | 9 |
| Example 1 | 24 | 4 |
| Comparative Example 1 | 25 | 8 |
| Comparative Example 2 | 40 | 8 |
| Comparative Example 3 | 13 | 3 |
| Comparative Example 4 | 13 | 3 |

As is clear from the results shown in above Table 4, in the wear resistant members according to the respective Examples 1-7 in which the primary sintering step was performed so as to attain a relative density of 80 to less than 98% and the secondary sintering step was performed so as to attain a relative density 98% or more, it was confirmed that the maximum value of the longer diameter of the silicon nitride crystal grains was 40 μm or less, and any coarse silicon nitride crystal grain having a longer diameter exceeding 40 μm was not generated in a structure of the wear resistant member.

Further, in each of the wear resistant members according to the respective Examples 1-7, the average aspect ratio of the silicon nitride crystal grains were 2 or more, and it was confirmed that the wear resistant member formed a microstructure in which the columnar silicon nitride crystal grains were complicatedly entangled to each other.

Next, silicon nitride sintered bodies that are the same as the wear resistant members of the respective Examples 1-7 and Comparative Examples 1 were prepared. With respect to as-sintered surface and ground surface of the respective silicon nitride sintered bodies, an XRD analysis was conducted, so that it was confirmed whether a crystalline peak of Ca compound or Mg compound is detected or not. In addition, a load of a grinding work was measured when each of the silicon nitride members was subjected to the grinding work so as to obtain a surface roughness Ra of 1 μm or 0.1 μm. In this regard, the load at the grinding work is indicated as a ratio of grinding time by assuming that the grinding time in Comparative Example 1 is 100 as a comparison base. Table 5 shows the measured results.

TABLE 5

| Sample No. | Presence or Absence of Peak of Ca Compound detected by XRD | | Presence or Absence of Peak of Mg Compound detected by XRD | | Load at Grinding Work | |
|---|---|---|---|---|---|---|
| | As-sintered Surface | Ground Surface | As-sintered Surface | Ground Surface | Ra 1 μm | Ra 0.1 μm |
| Example 1 | Non | Non | Non | Non | 95 | 75 |
| Example 2 | Non | Non | Non | Non | 92 | 76 |
| Example 3 | Non | Non | Non | Non | 93 | 82 |
| Example 4 | Non | Non | Non | Non | 94 | 77 |
| Example 5 | Non | Non | Non | Non | 93 | 80 |
| Example 6 | Non | Non | Non | Non | 96 | 77 |
| Example 7 | Non | Non | Non | Non | 95 | 80 |
| Comparative Example 1 | Observed | Observed | Observed | Observed | 100 | 100 |

As is clear from the results shown in above Table 5, as the result of conducting an XRD analysis to the ceramic sintered bodies according to the respective Examples, a crystalline peak of Ca compound or Mg compound was not detected at all to both the as-sintered surface and the ground surface of the respective ceramic sintered bodies. As a result, it was confirmed that the crystalline Ca compound or Mg compound were not existing in the respective wear resistant members.

In addition, it was also confirmed that an aimed ground surface could be obtained in a shorter grinding work time than that of Comparative Example 1. In contrast, in Comparative Example 1, a diffraction peak of a Y—Hf—O type crystalline compound was detected.

Examples 8-11 and Comparative Example 5

Next, in a case where rolling balls (bearing balls) as one kind of the wear resistant member are manufactured, characteristics of thus manufactured rolling balls will be evaluated.

A plurality of material powder mixtures for the respective Examples 8-11 and Comparative Example 5 were prepared so as to have compositions shown in Table 6 hereunder.

TABLE 6

| Sample No. | Silicon Nitride Material Powder | | | Sintering Agent Powder Content |
|---|---|---|---|---|
| | Fe Content (ppm) | Ca Content (ppm) | Mg Content (ppm) | |
| Example 8 | 100 | 1200 | 50 | $Y_2O_3$ (5 mass %) $Al_2O_3$ (4 mass %) AlN (0.5 mass %) $TiO_2$ (1 mass %) |
| Example 9 | 200 | 1400 | 100 | $Y_2O_3$ (5 mass %) $Al_2O_3$ (3.5 mass %) AlN (0.5 mass %) $TiO_2$ (1 mass %) |
| Example 10 | 300 | 1300 | 300 | $Y_2O_3$ (4.5 mass %) $Al_2O_3$ (3 mass %) AlN (1 mass %) $HfO_2$ (1.5 mass %) |
| Example 11 | 600 | 1500 | 400 | $Y_2O_3$ (5 mass %) $Al_2O_3$ (2 mass %) AlN (2 mass %) $HfO_2$ (1.5 mass %) |
| Comparative Example 5 | 100 | 50 | 30 | $Y_2O_3$ (5 mass %) $Al_2O_3$ (4 mass %) AlN (0.5 mass %) $TiO_2$ (1 mass %) |

Next, the material powder mixtures were molded thereby to form bearing-ball molded bodies having the above compositions shown in Table 6. Then, the bearing-ball molded bodies were subjected to the primary sintering operation and the secondary sintering operation under the conditions shown in Table 8, thereby to manufacture the respective bearing balls having diameters shown in Table 7.

TABLE 7

| Sample No. | Diameter of Bearing Ball (mm) |
|---|---|
| Example 8 | 3 |
| Example 9 | 10 |
| Example 10 | 15 |
| Example 11 | 20 |
| Comparative Example 5 | 3 |

TABLE 8

| Sample No. | Primary Sintering | | | Secondary Sintering (HIP) | | |
|---|---|---|---|---|---|---|
| | Temp. × Time (° C.) × (h) | Cooling Rate (° C./h) | Relative Density of Sintered Body (%) | Temp. × Time (° C.) × (h) | Cooling Rate (° C./h) | Relative Density of Sintered Body (%) |
| Example 8 | 1780 × 4 | 120 | 95 | 1700 × 1 | 100 | 99 or more |
| Example 9 | 1800 × 5 | 120 | 96 | 1680 × 2 | 200 | 99 or more |
| Example 10 | 1830 × 5 | 270 | 97 | 1750 × 2 | 150 | 99 or more |
| Example 11 | 1780 × 5 | 320 | 95 | 1680 × 2 | 200 | 99 or more |
| Comparative Example 5 | 1850 × 8 | 30 | 98 | 1750 × 1 | 60 | 99 or more |

Next, with respect to the five measuring points A-E set on cross sections of thus obtained respective bearing balls as shown in FIG. 1, Vickers hardness, fracture toughness, density and dispersions thereof were measured. Notes, the measuring method was the same as a method used in Example 1. Further, rolling lives of the bearing balls were also measured.

The rolling life of the rolling ball as the wear resistant member was measured by using the aforementioned thrust-type rolling wear (abrasion) testing apparatus 1 shown in FIG. 3.

In this connection, in the previously mentioned method for measuring the rolling life of the plate-shaped wear resistant member, a plate-shaped member 3 shown in FIG. 3 was composed of the wear resistant member, while the rolling balls 4 were composed of SUJ2.

However, contrary to the previous case, in the present measuring method, a plate-shaped member composed of SUJ2 was used as the plate member 3, while rolling balls 4 (surface roughness Ra of 0.01 μm), that were formed by working the wear resistant members according to Examples 8-11 and Comparative Examples 5, were used.

In this measuring operation using the thrust-type rolling wear testing apparatus 1, the rolling balls 4 each composed of the wear resistant members were applied with a load so as to receive a maximum contact stress of 5.9 GPa. Under this condition, a drive shaft 6 and these rolling balls 4 were rotated at a rotation speed of 1200 rpm. Then, until a time when a surface of the rolling balls 4 composed of the wear resistant member was exfoliated, was measured as the rolling life. In this regard, the rotation time was measured by setting an upper limit of 400 hours as a maximum rotation time (hour).

Table 9 shows the measured results.

As is clear from the results shown in above Table 9, in the rolling balls each composed of the wear resistant members according to the respective Examples 8-11, it was confirmed that all dispersions of the Vickers hardness, fracture toughness value, and the density were small. Further, the maximum longer diameter of silicon nitride crystal grains was all 0.01 μm or less, and the aspect ratio was 2 or more. In addition, each of the density of thus obtained respective bearing balls was 3.18 g/cm$^3$ or more.

On the other hand, in the bearing balls that are wear resistant members of Comparative Examples 5, the dispersion of the fracture toughness was large.

Furthermore, the as-sintered surface and the ground surface of the bearing balls composed of silicon nitride sintered bodies according to the respective Examples 8-11 and Comparative Example 5 were subjected to an XRD analysis, thereby to confirm whether a crystalline peak of Ca compound was detected or not.

Further, the load at the grinding work was measured. The load at the grinding work is indicated as a ratio of grinding time by assuming that the grinding time in Comparative Example 5 is 100 as a comparison base. Table 10 shows the measured results.

TABLE 9

| Sample No. | Vickers Hardness (Hv) | | Fracture Toughness (MPa · m$^{1/2}$) | | Dispersion of Density (%) | Rolling Life (Bearing Ball) |
|---|---|---|---|---|---|---|
| | Average | Dispersion | Average | Dispersion | | |
| Example 8 | 1460 | ±2% | 6.3 | ±4% | ±0.1 | 400 h or more |
| Example 9 | 1450 | ±3% | 6.3 | ±5% | ±0.2 | 400 h or more |
| Example 10 | 1450 | ±5% | 6.3 | ±6% | ±0.2 | 400 h or more |
| Example 11 | 1450 | ±6% | 6.2 | ±5% | ±0.4 | 400 h or more |
| Comparative Example 5 | 1440 | ±8% | 6.0 | ±12% | ±0.4 | 360 h |

TABLE 10

| Sample No. | Presence or Absence of Peak of Ca Compound detected by XRD | | Presence or Absence of Peak of Mg Compound detected by XRD | | Load at Grinding Work | |
|---|---|---|---|---|---|---|
| | As-sintered Surface | Ground Surface | As-sintered Surface | Ground Surface | Ra 0.1 μm | Ra 0.01 μm |
| Example 8 | Non | Non | Non | Non | 84 | 71 |
| Example 9 | Non | Non | Non | Non | 82 | 70 |
| Example 10 | Non | Non | Non | Non | 78 | 66 |
| Example 11 | Non | Non | Non | Non | 79 | 65 |
| Comparative Example 5 | Observed | Observed | Observed | Observed | 100 | 100 |

As is clear from the results shown in above Table 10, in contrast to the bearing ball of Comparative Example 5 in which a crystal of Ca compound is detected, in a case of the bearing balls each composed of the wear resistant members according to the respective Examples 8-11 in which the Ca compound is not detected, it was cleared that the grinding time could be greatly shortened, so that it was also confirmed that a working cost can be remarkably reduced.

Namely, the bearing balls of the present Examples can pass the rolling test of 400 hours, further can reduce the load of the grinding work. Furthermore, it was also cleared that the same surface roughness can be obtained by a shorter grinding time. Therefore, the manufacturing cost of the wear resistant member can be greatly lowered and improved.

INDUSTRIAL APPLICABILITY

As described above, according to the wear resistant member of the present invention formed of ceramics sintered body mainly composed of silicon nitride sintered body, the ceramic sintered body contains 10 to 3500 ppm of an Fe component in terms of Fe element, more than 1000 ppm and 2000 ppm or less of a Ca component in terms of Ca element, and 1 to 2000 ppm of a Mg component in terms of Mg element, so that there can be provided a wear resistant member in which each of dispersions in density, hardness and fracture toughness of the wear resistant member is suppressed within a range of ±10%, and the wear resistant member also being excellent in reliability and a low-cost performance. Further, according to the present invention, it becomes possible to obtain an as-sintered surface (sintering-finished surface) which is easily ground.

Further, according to the method of manufacturing the wear resistant member, the wear resistant member is manufactured by: preparing a material powder mixture containing a silicon nitride material powder, a sintering agent powder, 10 to 3500 ppm of an Fe component in terms of Fe element, more than 1000 ppm to 2000 ppm of a Ca component in terms of Ca element, and 1 to 2000 ppm of a Mg component in terms of Mg element; molding the material powder mixture thereby to form a molded body; conducting a primary sintering operation to the molded body thereby to obtain a primary sintered body having a relative density of 80% or more and less than 98%; and conducting a secondary sintering operation to the primary sintered body thereby to obtain a secondary sintered body having a relative density of 98% or more, so that there can be easily manufactured a wear resistant member containing 10 to 3500 ppm of an Fe component, more than 1000 ppm to 2000 ppm of a Ca component, and 1 to 2000 ppm of a Mg component, and having dispersions in density, hardness and fracture toughness that are suppressed within a range of ±10%.

REFERENCE SIGNS LIST

1 . . . thrust type rolling wear (abrasion) testing apparatus, 2 . . . apparatus body, 3 . . . plate-shaped wear resistant member (or SUJ2 metal plate), 4 . . . rolling ball (or spherical wear resistant member), 5 . . . guide plate, 6 . . . driving rotation axis, 7 . . . retainer, 8 . . . lubricant oil.

The invention claimed is:

1. A wear resistant member comprising a ceramic sintered body, the ceramic sintered body comprising:
   silicon nitride,
   10 to 3,500 ppm by mass of a Fe component in terms of Fe element,
   more than 1,000 ppm up to 2,000 ppm by mass of a Ca component in terms of Ca element,
   1 to 2,000 ppm by mass of a Mg component in terms of Mg element,
   1 to 5 mass % of a rare earth component in terms of a rare earth element, and
   1 to 5 mass % of an Al component in terms of Al element;
   wherein in the ceramic sintered body:
   a β-phase ratio of silicon nitride crystal grains is 95% or more,
   an average aspect ratio, which is defined as an average value of respective aspect ratios of silicon nitride crystal grains, is 2 or more,
   a maximum longer diameter of the silicon nitride crystal grains in the ceramic sintered body is 40 μm or less, and
   a grain boundary phase comprises amounts of the Ca component and Mg component that are below a detection limit of XRD (X-ray diffraction);
   wherein the Ca component and the Mg component have been substantially changed into an amorphous form in the ceramic sintered body, and
   wherein the ceramic sintered body comprises a ground surface having a surface roughness Ra of 1 μm or less; and
   wherein the ceramic sintered body has a Vickers hardness of 1,430 or more, a fracture toughness of 6.0 MPa·m$^{1/2}$ or more and a density of 3.18 g/cm$^3$ or more; and
   wherein the dispersion of the hardness, fracture toughness and density of the wear resistant member is within a range of ±10%.

2. The wear resistant member of claim 1, wherein the ceramic sintered body further comprises 0.1 to 5 mass % of at least one element selected from the group consisting of Ti, Zr, Hf, W, Mo, Ta, Nb, and Cr.

3. The wear resistant member of claim 1, wherein the ceramic sintered body further comprises 0.1 to 5 mass % of Hf.

4. The wear resistant member of claim 1, wherein the ceramic sintered body has a density of 3.25 g/cm³ or more.

5. The wear resistant member of claim 1, wherein the material powder mixture comprises a silicon nitride material powder, a sintering agent powder, 100 to 2,000 ppm by mass of a Fe component in terms of Fe element, more than 1,100 ppm up to 1,600 ppm by mass of a Ca component in terms of Ca element, and 100 to 1,000 ppm by mass of an Mg component in terms of Mg element.

6. The wear resistant member of claim 1, wherein the ceramic sintered body has a Vickers hardness of 1,430 or more, and a fracture toughness of 6.0 MPa·m$^{1/2}$ or more.

7. The wear resistant member of claim 1 that has a plate shape or a spherical shape.

8. A cutting tool, rolling jig, check ball of valve, engine, jig, tool rail, roller or other apparatus comprising the wear resistant member of claim 1.

9. A wear resistant member produced by a method comprising:
 preparing a material powder mixture comprising a silicon nitride material powder, a sintering agent powder, 10 to 3,500 ppm by mass of a Fe component in terms of elemental Fe, more than 1,000 ppm up to 2,000 ppm by mass of a Ca component in terms of elemental Ca, and 1 to 2,000 ppm by mass of a Mg component in terms of elemental Mg, 1 to 5 mass % of a rare earth component in terms of a rare earth element and 1 to 5 mass % of an Al component in terms of Al element;
 molding the material powder mixture to form a molded body;
 conducting a primary sintering operation on the molded body at a first sintering temperature of 1,600 to 1,950° C. to obtain a primary sintered body having a relative density of 80% or more and less than 98%;
 cooling the primary sintered body wherein a cooling rate at a temperature range of the first sintering temperature to 1,400° C. is controlled to be greater than 100° C./hour;
 conducting a secondary sintering operation on the primary sintered body at a second sintering temperature of 1,600 to 1,900° C. to obtain a secondary sintered body having a relative density of 98% or more;
 cooling the secondary sintered body wherein a cooling rate at a temperature range of the second sintering temperature to 1,400° C. is controlled to be greater than 100° C./hour; and
 grinding the ceramic sintered body so that a surface roughness Ra of the ceramic sintered body is 1 µm or less,
 thereby forming a wear resistant member that comprises a ceramic sintered body comprising silicon nitride;
 wherein in the ceramic sintered body:
 a β-phase ratio of silicon nitride crystal grains is 95% or more,
 an average aspect ratio, which is defined as an average value of respective aspect ratios of the silicon nitride crystal grains, that is 2 or more,
 a maximum longer diameter of the silicon nitride crystal grains in the ceramic sintered body is 40 µm or less,
 a grain boundary phase comprises amounts of the Ca component and Mg component that are below a detection limit of XRD;
 wherein the ceramic sintered body has a \Tickers hardness of 1,430 or more, a fracture toughness of 6.0 MPa·m$^{1/2}$ or more and a density of 3.18 g/cm³ or more;
 wherein the dispersion of the hardness, fracture toughness and density of the wear resistant member is within a range of ±10%; and
 wherein the Ca component and the Mg component have been substantially changed into an amorphous form in the ceramic sintered body.

10. The wear-resistant member of claim 9, wherein said method further comprises adding Fe, Ca and/or Mg to the material powder mixture to bring levels of these components to 10 to 3,500 ppm by mass of an Fe component in terms of elemental Fe, more than 1,000 ppm up to 2,000 ppm by mass of a Ca component in terms of elemental Ca, and 1 to 2,000 ppm by mass of a Mg component in terms of elemental Mg.

11. The wear-resistant member of claim 9, wherein said method further comprises selecting a material mixture that contains 10 to 3,500 ppm by mass of a Fe component in terms of elemental Fe, more than 1,000 ppm up to 2,000 ppm by mass of a Ca component in terms of elemental Ca, and 1 to 2,000 ppm by mass of a Mg component in terms of elemental Mg, without separately adding Fe, Ca or Mg to the silicon nitride material powder.

12. The wear-resistant member of claim 9, wherein in said method the secondary sintering operation is performed by conducting a hot isostatic pressing ("HIP") method on the primary sintered body.

13. The wear-resistant member of claim 1 that is produced by a primary sintering step that produces a sintered body having a relative density of 80 to less than 98% and a secondary sintering step that produces a sintered body that has a relative density of 98% or more.

14. The wear-resistant member of claim 1 that has an as-sintered surface that is easily ground compared to the surface of an otherwise identical wear-resistant member that has a grain boundary phase comprising amounts of the Ca component and Mg component that are above a detection limit of XRD (X-ray diffraction).

15. The wear-resistant member of claim 9, wherein the rate of cooling the primary and/or secondary sintered body is controlled to be 120 to 500° C./hour.

16. The wear-resistant member of claim 9, wherein the rate of cooling the primary and/or secondary sintered body is controlled to be 200 to 500° C./hour.

17. A set of wear-resistant members according to claim 1, wherein the dispersion of the hardness, fracture toughness and density of the wear resistant members within the set is within a range of ±10%.

18. A set of wear-resistant members according to claim 9, wherein the dispersion of the hardness, fracture toughness and density of the wear resistant members within the set is within a range of ±10%.

* * * * *